Dec. 15, 1970 D. J. PERLMAN 3,548,391
SENSE-INHIBIT WINDING FOR MAGNETIC MEMORY
Filed Jan. 15, 1968
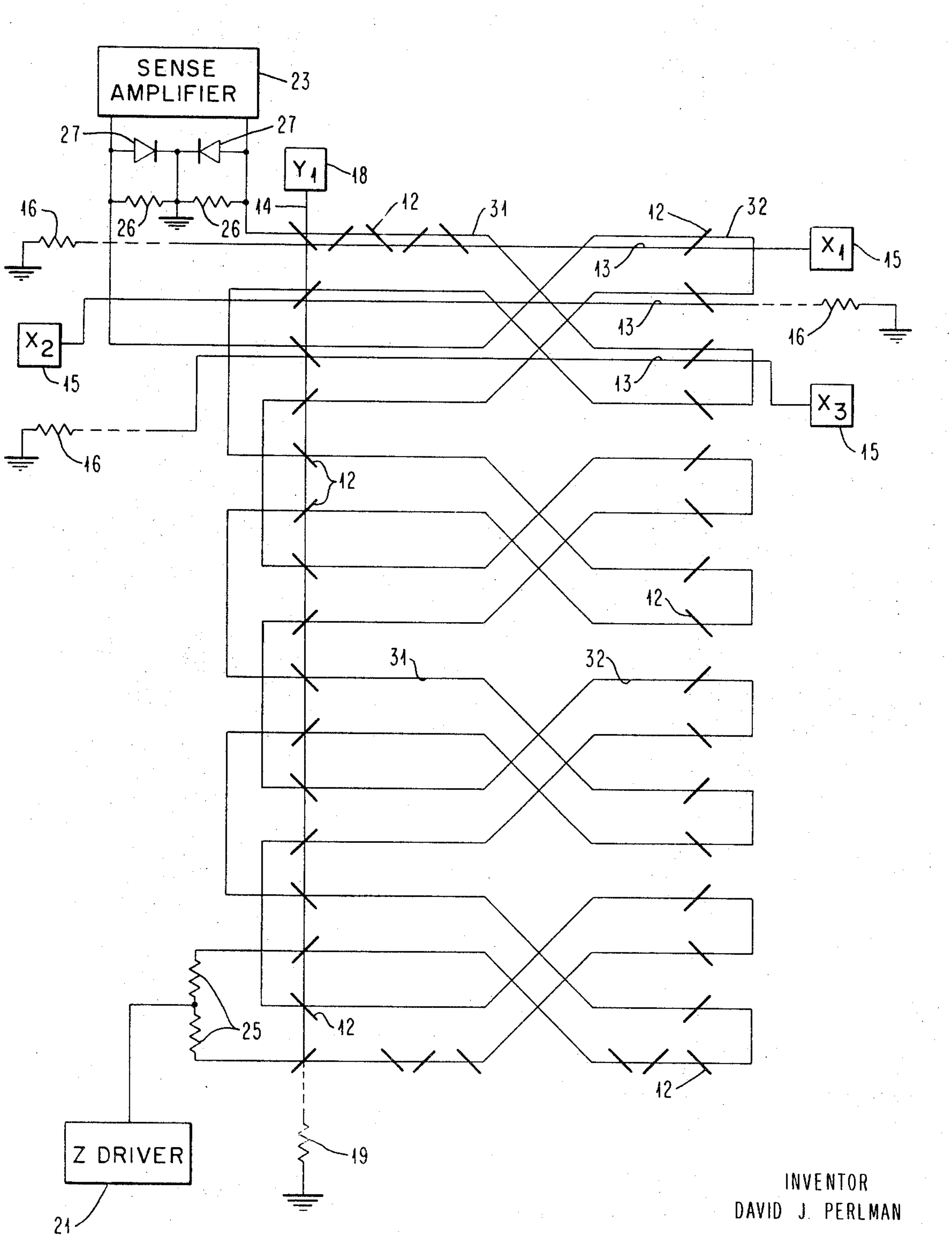
INVENTOR
DAVID J. PERLMAN
BY W. G. Robertson
ATTORNEY United States Patent Office 3,548,391

Patented Dec. 15, 1970

3,548,391

SENSE-INHIBIT WINDING FOR MAGNETIC MEMORY

David J. Perlman, Hopewell Junction, N.Y., assignor to International Business Machines Corporation, Armonk, N.Y., a corporation of New York Filed Jan. 15, 1968, Ser. No. 697,818
Int. Cl. G11c *5/02, 5/08*
U.S. Cl. 340—174 2 Claims

ABSTRACT OF THE DISCLOSURE

An improved sense-inhibit winding for a magnetic memory is provided by transposing the winding at the centerline of a core plane in a double cross over configuration In a magnetic memory, a bit of data is represented by a direction of residual magnetism of a storage element. For example, toroidal ferrite cores can be magnetized in one direction or the other according to the polarity of a current applied to wires that pass through the aperture of the core. One polarity drives the core to a direction to store a binary one and the opposite polarity drives the core to the opposite direction to store a binary zero. A memory cycle consists of a read operation followed by a write operation. In a read operation a core is driven to be magnetized in its zero direction. The change in magnetism of a core previously in one storing direction produces a voltage that can be detected and amplified to signify a logical one. A core already in the zero storing state undergoes only a slight change in magnetism and the absence of a significant voltage is detected as a logical zero. In a write operation a core is either magnetized to its one signifying direction or is left in its zero signifying direction.

The wires that carry drive currents are called drive wires, and in memories of the type using this invention there are two drive wires for each core. The drive wires are arranged in rows and columns on a supporting core frame. From this arrangement, the row wires are called X wires and the column wires are called Y wires. A core is located at each intersection of the X and Y wires, and thus for each core there is a unique combination of one X wire and one Y wire. The cores have generally rectangular hysteresis loops so that the magnetization is changed only when a core is driven above its coercive force. The currents on the X and Y wires are kept at a value below the coercive force called half-select and a core is switched only if both its X wire and Y wire receive half-selects.

The X and Y wires of one core plane are similarly threaded through other core planes so that energizing one X wire and one Y wire selects one core in each plane. The selected cores form a unit of data called a word. In memories of this type, each core plane has all of the cores that correspond to a particular bit position in the words that are stored in the memory.

For selectively writing zeros in some bit positions of a selected word, each core plane is provided with a third wire that is wound through each core and is enerergizable with a half select current to oppose the X and Y drive currents. Thus a core that is to store a zero receives a net half-select current, and it undergoes a small reversible change in magnetization that leaves the core in its zero signifying state. These opposing half select currents are called inhibit currents from the fact that they inhibit the operation of writing a one.

In memories of the type to which this invention applies, the inhibit wire also functions to carry the signal that may be produced by a storage element during a read operation. These windings are called sense-inhibit windings to signify their dual function. They are coupled to inhibit drivers that supply the half select value inhibit current and they are coupled to circuits called sense amplifiers that amplify and detect the small signals produced by the storage elements. Combining the sense and inhibit functions in a single winding is particularly useful in high speed memories. With only three wires instead of four, the cores can be made smaller and therefore can be switched faster.

Thus, a read operation takes place in the presence of noise voltages associated with the half-select currents on the drive wires and with other sources. It is a recognized goal in the art to provide a sense winding pattern that helps to cancel noise from various sources.

This goal is important because a noisy memory is slower than a similar memory with less noise. In a noisy memory, time delays must be provided to allow the noise voltages to die down to a level at which the signal voltages can be distinguished. It has been particularly difficult to provide winding patterns that meet the requirements of an inhibit function and also provide noise cancellation. The following somewhat simplified description of a successful prior art sense-inhibit winding will help to better explain the objects and features of this invention.

THE PRIOR ART

The sense-inhibit winding of Robert J. Flaherty et al. U.S. Pat. 3,381,282 (assigned to the assignee of this invention) illustrates many of the known sources of noise and the techniques that have been developed to overcome the noise. In the Flaherty memory, the sense-inhibit winding is wound parallel to the X drive wires. This arrangement (which permits wiring core planes by automatic machines) results in close inductive coupling between the sense-inhibit winding and the X drive wires, and a significantly large noise voltage appears on the sense-inhibit winding when an X driver is turned on or turned off. To limit the effects of this noise, the sense-inhibit winding is made in two parts. Each part is connected at one end to the inhibit driver. At the other end each wire is connected to an input of a differential sense amplifier which rejects voltages (called common mode voltages) which appear equally at the two inputs. Each part of the wire is wound to parallel one-half of the row length of each X drive wire and the noise associated with an X driver is in this way made to appear at both terminals of the sense amplifier.

In the memory of Flaherty, each row length portion of the sense-inhibit wire is offset from one row to another along the column centerline. Thus a row length portion links the cores of one row on one side of the centerline and the cores of another row on the other side of the centerline. The row length portions are interconnected at their ends to form the two part sense-inhibit winding.

In order for the sense-inhibit winding to carry out its inhibit function during a write operation, the wire must oppose the polarity of the X and Y drivers. In the Flaherty memory, the alternate X wires are driven from opposite sides of the core plane and the sense-inhibit wires are offset 2 rows at the centerline. Thus a row length of sense-inhibit wire parallels two X wires that are driven in the same direction.

Prior art memories also provide cancellation of the noise voltages that are capacitively coupled to the sense-inhibit winding from a Y drive wire. The two parts of the sense-inhibit wire cross each Y wire an equal number of times and thereby receive closely equal noise voltages.

This invention preserves the advantages of the prior art that have been discussed so far; it provides improved noise cancellation; and it is more fully adapted to wiring by automatic machines. This improved winding will be explained in the next section.

THE INVENTION

In the memory of this invention, the sense-inhibit winding is made in two parts and each part is connected to a differential sense amplifier (or other common mode noise rejecting circuit) and to an inhibit driver. The sense-inhibit winding is disposed parallel to the X (arbitrarily) direction of the core plane and is transposed at the centerline to provide noise cancellation.

The details of the winding can be understood from a repeating pattern that occupies 4 rows of the core plane. One part of the winding starts on a first side of the core plane at the first row and is transposed at the centerline to the third row. From the second side of the core plane, it is returned through the fourth row on the second side of the core plane and then through the second row on the first side of the core plane.

The other part of the sense-inhibit winding is wound in a complementary fashion so that the two parts result in a double row cross over at the center line of the core plane. The other part starts on the first side of the core plane in the third row and is transposed at the centerline to the first row. From the second side of the core plane it is returned through the second row on the second side of the centerline and the fourth row on the first side of the centerline.

To continue the pattern, the ends of the two parts that appear at the second row and the fourth row are each jumpered to the fifth row and the seventh row respectively (which are the first and third rows of the next four row group).

Preferably, the crossovers are made by printed circuit connections on a support at the centerline of the core frame. With this arrangement, the sense-inhibit winding is formed entirely of straight half row length wires and formed connections at the sides and the centerline of the core plane.

In this arrangement each half row length of the sense-inhibit winding is connected directly to a half row length that is located in an adjacent row and carries current in the opposite direction. This feature gives the sense-inhibit winding low inductance and thereby improves the rise time of an inhibit current pulse and reduces the noise that occurs when the inhibit driver is turned off at the end of a write operation.

The winding also has improved balance between the drive wires and the two parts of the sense amplifier. The winding is better balanced in the region of the centerline cross overs. The driven X drive wire and the adjacent half row lengths of the sense-inhibit wire is balanced, and the remote lengths of the sense-inhibit winding are also balanced in their coupling to the driven X wire.

With this arrangement, the noise voltages associated with the X drivers appear in phase at the input terminals of the differential amplifier.

The features and advantages of the invention will be apparent from the following more particular description of the preferred embodiment of the invention, as illustrated in the accompanying drawing.

THE DRAWING

The drawing shows a memory core plane with the sense-inhibit winding of this invention.

THE PREFERRED EMBODIMENT

*Introduction.*—The drawing shows representative cores 12 arranged in an array of rows and columns. For each row there is an X drive wire represented by wires 13 and for each column there is a Y drive wire represented by wire 14. The wires are supported on a rectangular core frame (not shown in the drawing), and the ends of the wires are welded to tabs that are mounted on the frame. Each X wire 13 is connected at one end to an X driver 15 that is designated by a number subscript in the drawing. At its other end, each X drive wire is extended through other similar core planes (as the broken lines represent) to a terminating resistor 16 which is connected to ground. Each Y drive wire is similarly connected with a Y driver 18 and a terminating resistor 19. The broken line in the Y drive circuit represents the connection through other core planes, and it also indicates that each core plane may have several individual sense-inhibit winding segments like the segment shown in the drawing.

The drive wires are arranged to be driven from alternate sides of the core plane. For example, X drivers 1 and 3 are located on the right side of the core plane and the driver X2 for the intervening wire is located on the left side. The diagonal orientation of the cores in the drawing also shows the alternating pattern of drive current direction of the X and Y drivers.

During a read operation one X driver and one Y driver are turned on to apply a current of a first polarity to the associated drive wires. In the following write operations, the two drivers are turned on to apply a current of the opposite polarity to the two drive wires.

Each segment of the sense-inhibit winding is provided with an inhibit (Z) driver 21 and a sense amplifier 23. The inhibit driver is connected to one end of the sense-inhibit winding through resistors 25 that help to divide the inhibit current and to terminate the winding. The sense amplifier is connected to the other end of the sense-inhibit winding with a network of resistors 26 and diodes 27 for terminating the winding and for limiting the voltage across the sense amplifier terminals during an inhibit operation.

During an operation to write a binary 0, the inhibit driver 21 is turned on to provide a current in a polarity to oppose the X and Y write currents.

The features of the memory that have been described so far are conventional. The specific components and organization of the drawing will suggest a wide range of memories with which the sense-inhibit winding is useful.

*The sense-inhibit winding.*—The sense-inhibit winding is made in two parts 31 and 32. The two parts are wound in a repeating pattern that is illustrated by the four uppermost rows in the drawing. Part 31 starts at the left hand side of row 1 where it is connected to a terminal of the sense amplifier. It is wound across through the left half of row 1 and the right half of row 3, and is wound back through the right half of row four and the left half of row 2. Part 32 starts at the left hand side of row 3 where it is connected to the other terminal of the sense amplifier. It is wound across through the left half of row 3 and the right half of row 1 and is wound back through the right half of row 2 and the left half of row 4.

The pattern of the first four rows is repeated for a desired number of times in a winding segment. Part 31 is continued to the first row of the next group and part 32 is continued to the third row of the next group. Thus, along the left side of the array, each row of the sense-inhibit winding is jumpered over two intervening wires for all the interconnections along the left side (except for the connections to the sense-inhibit circuitry).

The first and third rows of the first group and the second and fourth rows of the last group are connected to the sense-inhibit circuitry. Preferably, as the drawing shows, the winding is connected to the sense amplifier and to the inhibit driver at opposite ends. The inhibit driver is connected to provide a current to oppose the X and Y drive currents on a write operation.

The cross overs are preferably formed by preformed connectors that are supported by an extension of the core frame (not shown) along the centerline of the core plane. The sense-inhibit winding is formed in half row lengths that are welded to the cross overs at their inner ends and to the jumpers along the sides of the core frame at their outer ends. Preferably, the sense-inhibit wires are positioned directly under the X drive wires and the Y driver wires are positioned in between.

*The sensing operation.*—During a read operation one X driver and one Y driver are turned on to select one core in a segment. The X and Y drive wires are inductively and capacitively coupled to the sense-inhibit winding and produce noise on the two parts 31 and 32. In the memory of this invention the two parts are closely balanced with respect to the X and Y wires are the noise voltages cancel in the differential sense amplifier. For example, the winding is oriented with respect to the drivers such that noise voltages from the X drivers appear in phase at the sense amplifier although they occur in succession on the two parts of the winding. The symmetry of the winding establishes balanced inductive coupling between any selected X drive wire and the remote parts of the sense-inhibit winding as well as the parts adjacent the selected drive wire. The crossovers also provide balanced inductive coupling along the centerline of the plane. Other aspects of the balancing have been explained in the introductory explanation of the invention.

While the invention has been particularly shown and described with reference to preferred embodiments thereof, it will be understood by those skilled in the art that various changes in form and detail may be made therein without departing from the spirit and scope of the invention.

What is claimed is:

1. A memory having a support, drive wires formed in an array of rows and columns on said support, magnetic cores located at the intersections of row and column wires in an alternating diagonal pattern, means for driving selected drive wires arranged with adjacent the wires driven in opposite polarities, a sense amplifier, an inhibit driver, and an improved sense-inhibit winding comprising, half row wire lengths each positioned between a side of the array and a centerline in close proximity to a half row portion of a row drive wire to be coupled to a half row group of storage elements, cross over means located at said centerline and interconnecting said half row lengths in a pattern that repeats for four row groups in which first and third rows on opposite sides of said centerline are interconnected and second and fourth rows on opposite sides are interconnected in a two row cross over configuration, means for each said four row group located along one of said sides to interconnect the first and second rows and to interconnect the third and fourth rows, means for a first four row group located along the other of said sides connecting the first and third rows to a sense amplifier and connecting the second and fourth rows respectively to the first and third rows of a second four row group, means for a last four row group located along said other side connecting the second and fourth rows to an inhibit driver and connecting the first and third rows respectively to the second and fourth row of a next to the last four row pattern, and means located along said other side for each other wire interconnecting first and third rows respectively with second and fourth rows of a preceding group and second and fourth rows respectively with first and third rows of a next group, said means connecting said sense amplifier and said inhibit driver to said sense-inhibit winding arranged such that currents applied to said row drive wires propagate in a direction toward said sense amplifier whereby the noise voltages originating in succession on the two parts of the winding appear in phase at said sense amplifier.

2. A sense-inhibit winding for a memory having a sense amplifier, an inhibit driver, storage elements in a row and column array, row wires and column array, row wires and column wires coupled to the storage elements, and drivers arranged to drive adjacent drive wires in opposite polarities, comprising, as a four row repeating pattern, a first part extending from the first row at one side of the array to the centerline of the array and from said centerline through the third row to the other side of the array and returning through the fourth wire to the centerline and from said centerline through the second wire to said one side, a second part extending from said third row at said one side to said centerline, from said centerline to said other side through said first row, through said second row to said centerline, and through said fourth row to said one side means connecting said sense amplifier at one end of said winding and said inhibit driver at the other end of said winding such that said drivers for said rows propagate currents in a direction toward said sense amplifier whereby noise voltages originating in succession on said first and second winding parts appear in phase at said sense amplifier.

References Cited

UNITED STATES PATENTS

| | | | |
|---|---|---|---|
| 3,191,163 | 6/1965 | Crawford | 340—174 |
| 3,329,940 | 7/1967 | Barnes et al. | 340—174 |
| 3,381,282 | 4/1968 | Flaherty et al. | 340—174 |
| 3,409,883 | 11/1968 | Norton | 340—174 |

FOREIGN PATENTS

| | | | |
|---|---|---|---|
| 148,667 | 1/1967 | Japan | 340—174 |

OTHER REFERENCES

"Interlocking Segmentation of Large Memories" by Booth, IBM Technical Disclosure Bulletin, vol. 1, No. 6, April 1959, pp. 40–41.

"Memory Plane Having Combination Sense-Inhibit Winding" G. Constantine Jr., IBM TDB, vol. 3, No. 1, June 1960, p. 45.

"Crossover Balanced Inhibit Segments" by E. D. Councill et al. IBM TDB, vol. 6, No. 4, September 1963, pp. 55–56.

JAMES W. MOFFITT, Primary Examiner